(12) United States Patent
Kenney et al.

(10) Patent No.: US 6,279,373 B1
(45) Date of Patent: Aug. 28, 2001

(54) AUTOMATIC REFERENCE-PRESSURE BALANCE METHOD

(75) Inventors: Danny Kenney; Keith Lindberg, both of Sherman, TX (US)

(73) Assignee: Globitech, Inc., Sherman, TX (US)

( * ) Notice: Subject to any disclaimer, the term of this patent is extended or adjusted under 35 U.S.C. 154(b) by 0 days.

(21) Appl. No.: 09/378,881

(22) Filed: Aug. 23, 1999

Related U.S. Application Data

(63) Continuation-in-part of application No. 09/137,354, filed on Aug. 20, 1998.
(60) Provisional application No. 60/056,821, filed on Aug. 22, 1997, now abandoned.

(51) Int. Cl.$^7$ .................................................. G01L 27/00
(52) U.S. Cl. ............................................................ 73/1.63
(58) Field of Search .................................. 73/1.57–1.59, 73/1.62, 1.63, 865.8

(56) References Cited

U.S. PATENT DOCUMENTS

| | | | |
|---|---|---|---|
| 4,576,035 | * | 3/1986 | Hooven et al. .......................... 73/1.59 |
| 5,808,175 | | 8/1998 | Chang ..................................... 73/1.58 |

FOREIGN PATENT DOCUMENTS

| | | | |
|---|---|---|---|
| 1247700 | * | 7/1986 | (SU) ...................................... 73/1.59 |
| 1275-243-A1 | | 12/1986 | (SU) ...................................... 73/1.58 |
| 1441-212-A1 | | 11/1988 | (SU) ...................................... 73/1.58 |

* cited by examiner

*Primary Examiner*—Robert Raevis
(74) *Attorney, Agent, or Firm*—Jones, Day, Reavis & Pogue

(57) ABSTRACT

The present invention provides a system and method for calibrating pressure sensors associated with chambers in a processing facility. The system calibrates the pressure sensors while the chamber are open to each other, such as through an open slit valve or vacuum sealed door. Maintaining the pressure in the chambers relative to each other prevents a rush of gases, condensate or other foreign materials into an adjacent chamber that may occur when the pressure between the chambers is not equalized. This prevents contamination of the materials being processed, and eliminates the need for system shut-down to calibrate sensors. Also, since calibration occurs every time the slit valve is open, the calibration is real-time and does not allow the pressure differential between the chambers to become too great.

15 Claims, 3 Drawing Sheets

AUTOMATIC REFERENCE-PRESSURE BALANCE METHOD

CROSS REFERENCE TO RELATED APPLICATIONS

This application is a continuation in part of patent application Ser. No. 09/137,354, filed Aug. 20, 1998 which claims priority from U.S. Provisional Patent Application Ser. No. 60/056,821, filed Aug. 22, 1997.

TECHNICAL FIELD

This invention relates generally to semiconductor processing and, more particularly, to a system and method for calibrating gas or liquid pressure during wafer processing.

BACKGROUND

Contamination of materials is a factor in many manufacturing processes, and is of particular concern in the fabrication of integrated circuits. In general, integrated circuit technology is based on the ability to form numerous transistor structures on a single semiconductor substrate. Typically, multiple integrated circuits will be formed on a single silicon wafer, the wafer providing the semiconductor substrate for the circuits. The intricacy of the circuits and the large number of steps involved in the fabrication make it essential that each of the process steps be tightly controlled and meet very stringent specifications to prevent any type of contamination. To increase the purity and hence the quality and reliability of manufacturing processes, most are done in sealed rooms or chambers, where the environment, including temperature, pressure and purity of liquids or gases introduced can be controlled. One of the biggest sources of contamination occurs when the product being manufactured is transferred from one area of the manufacturing process to the next, which necessitates opening a door or valve to introduce the material into the next chamber or room. When the door or valve is open, if there is a pressure differential between the chambers, the potential for contamination is increased. Processing fluid and/or gas will rush from the chamber with the higher pressure to the chamber with the lower pressure to equalize the pressure, bringing solids and liquids along with the gas, which may cause such problems as condensation and particulate contamination on the material being manufactured.

The solutions used to mitigate the above-identified problem have included: reducing the amount of time that the door or valve is opened to reduce the amount of contaminants that enter the chamber; making the transfer in two stages; utilizing an intermediate or transfer chamber into which only one of the other chambers is opened at a given time; placing calibrated pressure sensors in each chamber; and tying the pressure sensors into the valve-opening mechanisms in both chambers to obtain a desired, consistent pressure balance before the valve between the chambers is opened. However, these solutions, separately or in combination, do not always adequately resolve the aforementioned problems.

Even minimizing the time the door or valve is open will result in some contamination, especially if the pressure is not equalized between the two chambers before opening the door or valve. One of the biggest problems in equalizing the pressure is keeping the pressure sensors calibrated, as sensors tend to drift in calibration over time. If the pressure sensor in either chamber is out of calibration, the pressure between the two chambers will not actually be equal, and when the door or valve is open, the gas will rush from the higher to lower pressure chamber to equalize the pressure. The effective drift of the pressure sensors is actually doubled if the two sensors drift calibration in opposite directions. If a sensor has drifted, process overseers are generally unaware of the problem until a rush of gas between the chambers has occurred, resulting in contamination of a manufactured product. In order to re-calibrate sensors that have drifted, the manufacturing process generally has to be shut down, and the sensor taken off-line to be calibrated, resulting in production down-time.

U.S. Pat. No. 5,808,175 issued Sep. 15, 1998 to Shen-Yan Chang discloses a method of temporarily, manually mounting a second, in-line calibrated sensor to the same chamber for the purpose of monitoring or correcting the first sensor. However, Chang only utilizes the second sensor for comparison to the readings obtained from the first sensor for the same chamber, to determine if it needs replacing. If there is drift in the sensors used to read the pressure in different chambers, a situation may still occur wherein the pressure differential between two chambers is such that a rush of gas and contaminants occurs when the door or valve between the two chambers is opened.

It would, therefore, be desirable to be able to provide a method and apparatus wherein the pressure in the two chambers between which materials are being transferred can be kept equal so that there will not be a rush of gas between the two chambers when the door or valve is opened.

SUMMARY

The present invention overcomes the above outlined problems and a technical advance is achieved by a system and method that equalizes and calibrates the pressure of two or more chambers on either side of a valve (door) during operation. In one embodiment, the method is performed each time the valve is opened. When the valve is opened, the pressure in the chambers will equalize. After the pressure in the chambers has equalized, pressure readings from sensors mounted in each chamber are calibrated relative to each other.

In some embodiments, the pressure readings are sent to a control module. The control module evaluates the readings taken from the sensors and adjusts them to match each other.

In some embodiments, there may be an intermediate, or transfer chamber between a process chamber and a loading chamber. The sensor readings from the process and loading chambers are adjusted to match the sensor readings of the transfer chamber. As a result, all the chambers will be calibrated with the transfer chamber, and therefore with each other.

Since calibration occurs every time the valve is open, the pressure differential between the chambers never becomes too great. As a result, there is little if any fluid flow (e.g., a flow processing gases and/or contaminants) between the chambers and a very clean chamber environment is maintained.

Also, because the relative calibration is done during actual use, the system does not have to be shut down to perform calibration routines. This, of course, results in increased productivity and cycle time.

DETAILED DESCRIPTION

Figure 1:
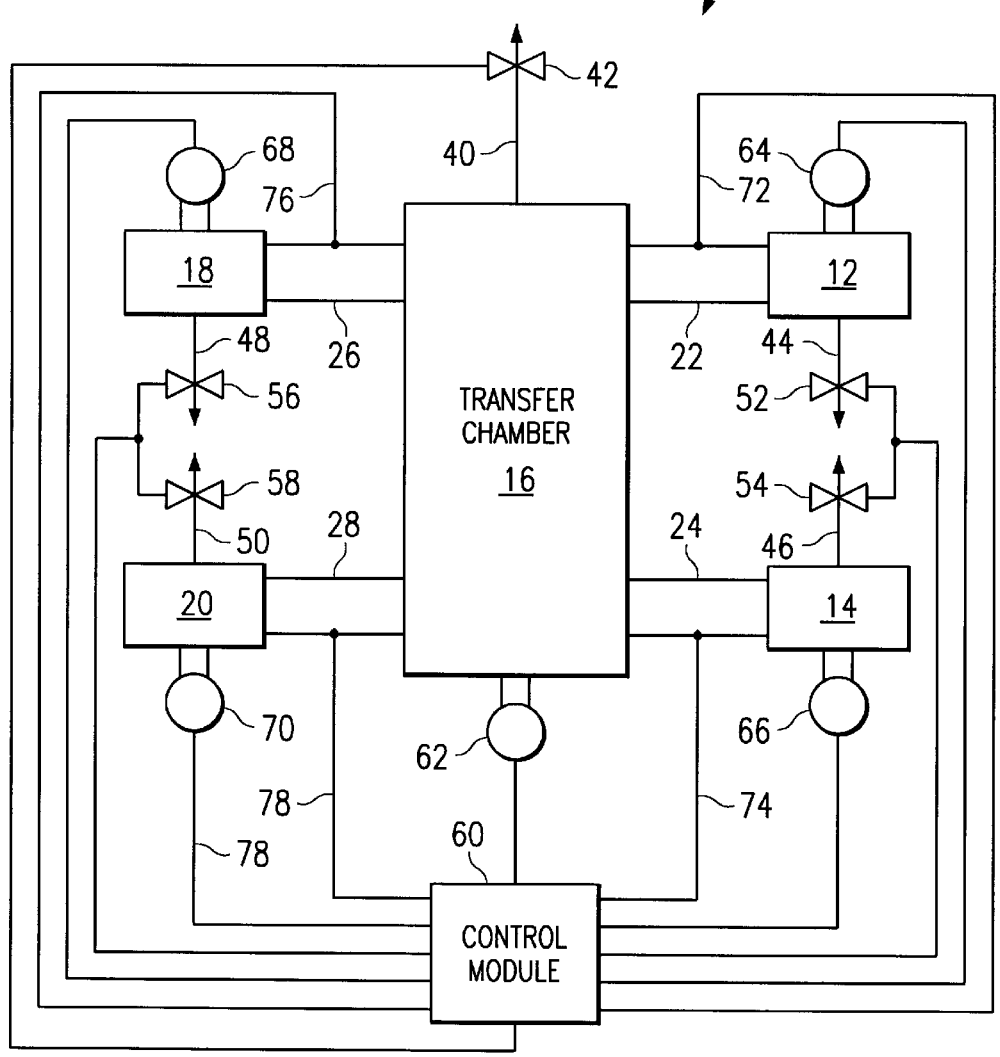
FIG. 1 is a diagram of an exemplary processing facility that utilizes a transfer chamber between operational chambers.

Referring to FIG. 1, reference numeral 10 designates a portion of an integrated circuit processing facility including two loading chambers 12, 14, a transfer chamber 16, and two process chambers 18, 20. Loading chambers are typically used for loading and unloading one or more materials for processing. Processing chambers are typically used for performing processing operations, and may include additional components for varying the temperature of the chamber or for adding processing fluids and/or constituents into the chamber. Transfer chambers are often used as an intermediate chamber between loading chambers and processing chambers, and may include a robot arm or some equivalent device for moving materials between the different chambers. To facilitate processing and maintain a clean environment, the different chambers must be hermetically sealed from each other at particular times.

The loading chambers 12, 14 are connected to the transfer chamber 16 through slit valves 22, 24, respectively. Likewise, the process chambers 18, 20 are connected to the transfer chamber 16 through slit valves 26, 28, respectively. Connected to the transfer chamber 16 is an exhaust line 40 with a variable restriction control valve 42 used for controlling the pressure in the chamber. Likewise, connected to the loading and process chambers 12, 14, 18, 20 are exhaust lines 44, 46, 48, 50 with variable restriction control valves 52, 54, 56, 58, respectively. Each of the variable restriction control valves 42, 52, 54, 56, 58 is controlled by a control module 60.

The control module 60 receives pressure readings from pressure sensors (e.g. transducers) 62, 64, 66, 68, 70 connected to loading chambers 12 and 14, transfer chamber 16, and process chambers 18, 20, respectively. Furthermore, the control module 60 is informed of the status (open or closed) of slit valves 22, 24, 26, and 28 through monitor lines 72, 74, 76, 78 respectively.

In operation, the control module 60 reads the pressure of the loading chamber 12 through the pressure sensor 64 and the transfer chamber 16 through the pressure sensor 62. The control module 60 then equalizes the pressure in the two chambers 16 and 12 by adjusting the variable restriction control valves 42 and 52 accordingly. As a result, the pressure in the loading chamber 12 matches that of the transfer chamber 16. Every time that the slit valve 22 is open between the chambers, the control module 60 calibrates the pressure sensors 62 and 64 relative to each other. The same process is performed every time the slit valve 24, 26, or 28 is open between the transfer chamber 16 and the loading or process chamber 14, 18, or 20, respectively. In a configuration of the system that utilizes a transfer chamber 16, such as that shown in FIG. 1, the pressure sensors for the chambers on either side of the transfer chamber are calibrated in reference to the pressure sensor for the transfer chamber so that it will be accurate regardless of which chamber connecting into it is opened at any one time.

Figure 2:
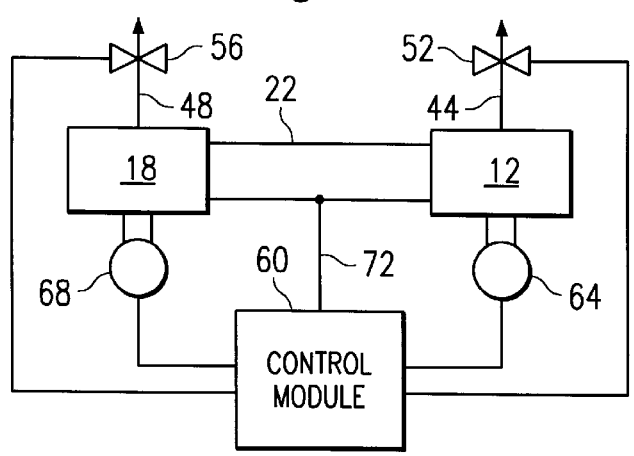
FIG. 2 is a diagram of an exemplary processing facility that does not utilize a transfer chamber between operational chambers.

Referring now to FIG. 2, the reference numeral 80 designates a portion of an integrated circuit processing facility with a direct chamber-to-chamber connection, including a loading chamber 12, and a process chamber 18. In this embodiment, the loading chamber 12 and the process chamber 18 are similar to those described in FIG. 1, except that no intermediate transfer chamber exists there between. The loading chamber 12 is connected to the process chamber 18 through the valve 22. Connected to the loading chamber 12 is an exhaust line 44 with a variable restriction control valve 52, used for controlling the pressure in the chamber. Likewise, connected to the process chamber 18 is exhaust line 48 with variable restriction control valve 56. Each of the variable restriction control valves 52, 56 is controlled by a control module 60.

The control module 60 receives pressure readings from pressure sensors (e.g. transducers) 64, 68 connected to the loading chamber 12 and the process chamber 18, respectively. Furthermore, the control module 60 is informed of the status (e.g. open or closed) of the slit valve 22 through the monitor line 72.

In operation, the control module 60 reads the pressure of the loading chamber 12 through the pressure sensor 64 and the process chamber 18 through the pressure sensor 68. The control module 60 then equalizes the pressure in the two chambers 12 and 18 by adjusting the variable restriction control valves 52 and 56 accordingly so the pressure in the loading chamber 12 matches that of the process chamber 18. Every time that the slit valve 22 is open between the chambers, and after the pressure of the two chamber has equalized, the control module 60 calibrates the pressure sensors 64 and 68 relative to each other.

Figure 3:
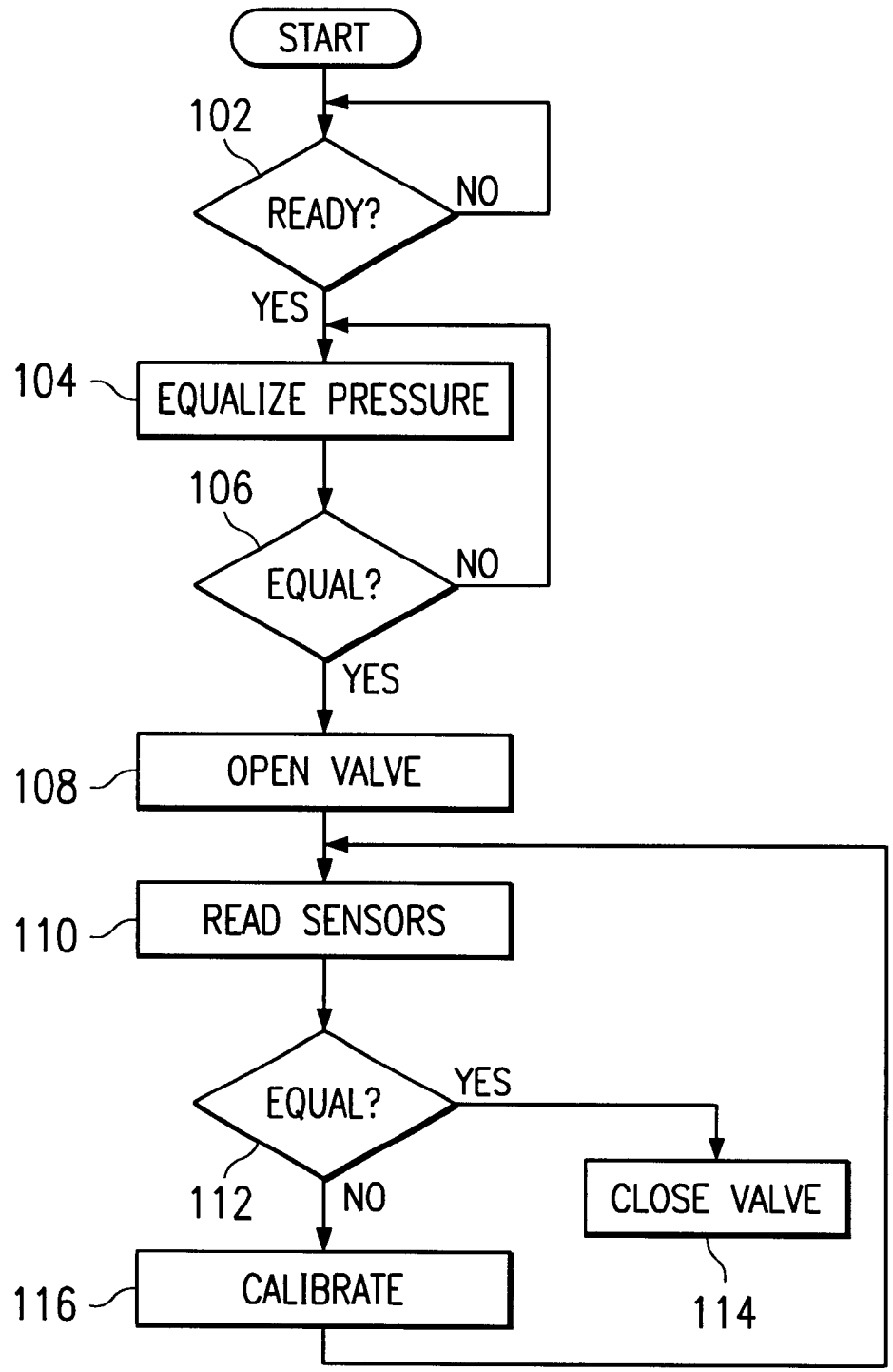
FIG. 3 is a method flow diagram showing the steps taken in calibrating the pressure sensors.
Figure 4:
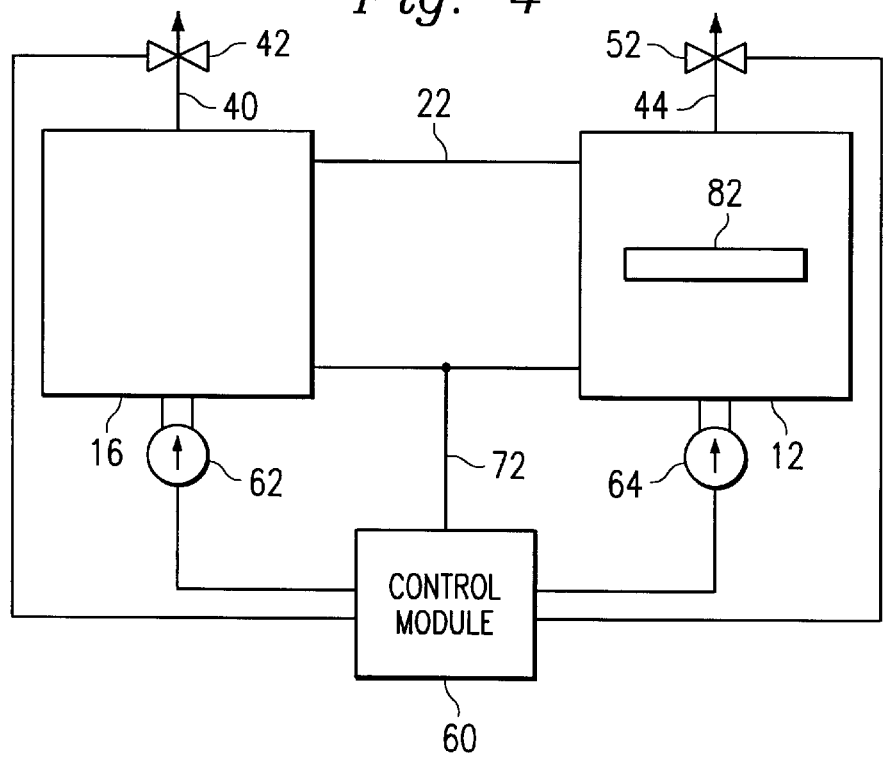
FIG. 4 is a diagram of two chambers of FIG. 1, separated by a valve.

Referring to FIG. 3, a calibration method 100 may be performed on a sensor inside the system 10 (FIG. 1). For the sake of example, the calibration method 100 is used after a wafer 82 is placed in the loading chamber 12 and is ready to be transferred to the transfer chamber 16. FIG. 4 shows a magnified portion of the system 10 for discussion with the present example.

Referring also to FIG. 4, a wafer 82 is in the loading chamber 12, ready for transfer to the next chamber 16 through the slit valve 22. At step 102, it is determined if the wafer 82 is ready for transfer to the next chamber. Since in the present example, the wafer is in the loading chamber 12, step 102 determines that the chamber has been properly closed and sealed. At step 104, the control module 60 equalizes the pressure between the loading chamber 12 and the next chamber (the transfer chamber, in the present example) 16. The control module 60 will not open the slit valve 22 until the pressure between loading chamber 12 and transfer chamber 16 is equalized. Specifically, the control module 60, using readings obtained from pressure sensors 62 and 64, will equalize the pressure in the transfer chamber 16 and loading chamber 12 by adjusting the variable restriction control valves 42 and 52, connected to the exhaust lines 40 and 44 respectively.

Figure 5:
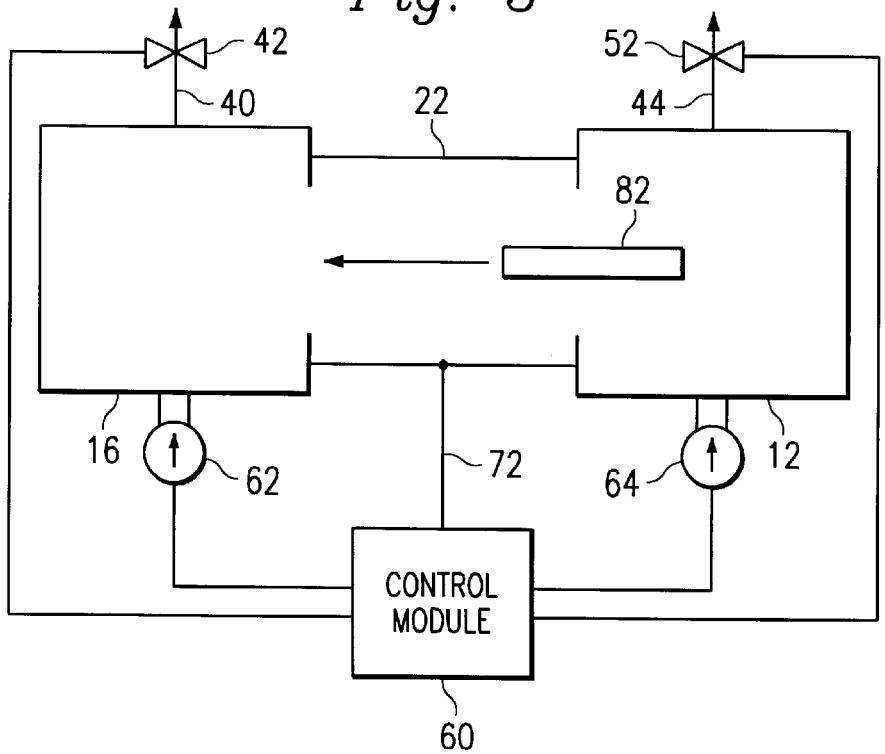
FIG. 5 is a diagram of the two chambers of FIG. 4 showing the pressure in each chamber being calibrated relative to the other chamber while the valve is open.

Referring now to FIGS. 3 and 5, at step 106, when the control module 60 receives readings from the pressure sensors 62 and 64 that indicate the pressures in the loading chamber 12 and transfer chamber 16 are equal, execution proceeds to step 108. The control module 60 sends a signal to the slit valve 22 to open, as shown in FIG. 5. The wafer 82 will then be shifted to the transfer chamber 16 through the slit valve 22.

While the slit valve 22 is open for the transfer of material, if there is any difference in the actual pressure between the loading chamber 12 and transfer chamber 16, it will be equalized automatically. At step 110, the control module 60 will then check the readings on the pressure sensors 62 and 64. At step 112, a determination is made as to whether the pressure sensors 62, 64 are calibrated relative to each other. If so, then execution proceeds to step 114 where the slit valve 22 is closed and processing continues on in a normal progression.

If at step 112 the pressure sensors 62, 64 read differently, execution proceeds to step 116 where the sensors are calibrated relative to each other. In one embodiment, the pressure sensor 64 is calibrated to the pressure sensor 62. By so doing, all of the pressure sensors 64, 66, 68, 70 (FIG. 1) will eventually be calibrated relative to pressure sensor 62 and thus to each other. It may be desirable, on a periodic basis, to calibrate pressure sensor 62 to a reference measurement. However, even this calibration has been simplified because only one sensor needs to be calibrated. Execution then returns to step 110. It is understood, however, that the control module 60 may have certain error modules so that the method will not continually loop to step 110 if the pressure sensors cannot be properly calibrated.

Because the pressure in the two chambers is known to be equal while the slit valve 22 is open, calibrating the sensors 62 and 64 relative to each other eliminates the potential for a rush of processing fluid and constituents between the chambers the next time the valve is open. Also, because the process of relative calibration is performed every time the slit valve 22 is opened, a variation of no more than 0.01–0.02 Torr should occur between any two calibrations. This is an improvement over the prior art, where variations of 5 Torr or greater between chambers would be common because of the infrequency of calibration.

Furthermore, because the relative calibration is done during actual use, the system does not have to be shut down to perform calibration routines quite as often as conventional systems. This, of course, results in increased productivity and cycle time.

Further still, the control module 60 can maintain a history of calibrations to determine if any of the pressure sensors must be repeatedly calibrated. This may indicate that the particular pressure sensor or corresponding chamber is faulty. Likewise, if a majority of the pressure sensors must be repeatedly calibrated, this may indicate that the pressure sensor for the transfer chamber 16, or corresponding chamber, is faulty.

Although the invention has been described with reference to specific embodiments, such as the manufacture of integrated circuit semiconductors, this description is not meant to be construed in a limited sense. The invention can be used in a variety of processes. Also, different types of valves and chamber may equally benefit from the present invention. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

What is claimed is:

1. A method for maintaining a consistent pressure between two chambers in a processing facility, wherein the two chambers have a slit valve there between, the method comprising the steps of:

determining when the slit valve is open;

measuring a pressure of the first chamber while the slit valve is open;

measuring a pressure of the second chamber while the slit valve is open;

calibrating first and second pressure sensors, associated with the first and second chambers, respectively, relative to each other while the slit valve is open; and closing the slit valve when the pressure sensors have been calibrated relative to each other.

2. The method of claim 1 wherein the slit valve is a vacuum-sealed door.

3. The method of claim 1 wherein the calibrating is performed by changing a reading value of the first pressure sensor to be in accordance with the second pressure sensor.

4. The method of claim 3 wherein the second chamber is a transfer chamber connecting the first chamber to a third chamber.

5. The method of claim 3 further comprising:

monitoring the change of the reading value of the first sensor; and determining if the change indicates a faulty system.

6. A method for maintaining a consistent pressure in a processing facility having a transfer chamber used to transfer materials to and from a process chamber, wherein the two chambers have a valve there between, the method comprising the steps of:

determining when the valve is open;

measuring a pressure of the transfer chamber while the valve is open;

measuring a pressure of the processing chamber while the valve is open;

calibrating a pressure sensor on the processing chamber relative to a pressure sensor on the transfer chamber while the valve is open; and closing the valve when the pressure sensors on the processing chamber and transfer chamber are relatively calibrated.

7. The method of claim 6 wherein the transfer chamber is also used to transfer materials to and from a loading chamber, the transfer chamber and loading chamber having a second valve there between, the method further comprising:

determining when the second valve is open;

measuring a pressure of the transfer chamber while the second valve is open;

measuring a pressure of the loading chamber while the second valve is open;

calibrating a pressure sensor on the loading chamber relative to the pressure sensor on the transfer chamber while the second valve is open; and closing the second valve when the pressure sensors on the loading chamber and transfer chamber are relatively calibrated.

8. An automated system for controlling processing of a product in a processing facility, said system compromising:

first, second, and third chambers;

first, second, and third pressure sensors associated with the first, second, and third chambers, respectively, for measuring a pressure inside each chamber;

first, second, and third exhaust lines connected to the first, second, and third chamber, respectively;

first, second, and third pressure restriction control valves connected to the first, second, and third exhaust lines, respectively;

a first material transfer valve connecting the first chamber to the second chamber;

a second material transfer valve connecting the second chamber to the third chamber a control module connected to the first and second material transfer valves, the first, second and third pressure sensors, the first, second and third variable restriction control valves, and the first, second and third chambers, the control module including processing capabilities for performing the steps of:

measuring the pressure in the first and second chamber while the first material transfer valve is closed;

adjusting the first and second variable restriction control valves until the first and second pressure sensors have similar readings while the first material transfer valve is closed; and calibrating the first pressure sensor to generate a reading similar to that of the second pressure sensor when the first material transfer valve is open.

9. The system described in claim 8 wherein the first and second material transfer valves are vacuum-sealed doors.

10. The system described in claim 8 wherein the transfer chamber includes a robot for handling of the materials being processed.

11. The system described in claim 8 wherein the control module also includes processing capabilities for:

detecting a fault in the system by monitoring the adjustment of the first pressure sensor over a period of adjustments.

12. The system described in claim 8 wherein the control module also includes processing capabilities for:

measuring the pressure in the second and third chambers while the second material transfer valve is closed;

adjusting the second and third variable restriction control valves until the second and third pressure sensors have similar readings while the second material transfer valve is closed; and calibrating the third pressure sensor attached to the third chamber to generate a reading similar to that of the second pressure sensor when the second material transfer valve is open.

13. The system described in claim 12 wherein the control module also includes processing capabilities for:

detecting a fault in the system by monitoring the adjustment of the first, second, and third pressure sensors over a period of adjustments.

14. The system described in claim 13 wherein the control module also includes processing capabilities for:

determining that the fault is associated with the third chamber if only the third sensor requires significant adjustment over the period of adjustments.

15. The system described in claim 13 wherein the control module also includes processing capabilities for:

determining that the fault is associated with the second chamber if both the first and third sensors require significant adjustment over the period of adjustments.

* * * * *